United States Patent [19]

Koyanagi et al.

[11] 4,126,719

[45] Nov. 21, 1978

[54] REINFORCED PLASTIC PRODUCTS WITH DECORATED SURFACES

[75] Inventors: Takuji Koyanagi, Nabari; Nobuhiro Ohno, Ueno, both of Japan

[73] Assignee: Ina Seito Co., Ltd., Aichi, Japan

[21] Appl. No.: 793,353

[22] Filed: May 3, 1977

[51] Int. Cl.$^2$ .............................................. B32B 7/00
[52] U.S. Cl. ................................ 428/35; 156/245; 264/257; 428/247; 428/251; 428/284; 428/287; 428/246
[58] Field of Search ............... 156/245; 428/246, 251, 428/252, 285, 287, 914; 264/257

[56] References Cited

U.S. PATENT DOCUMENTS

| | | | |
|---|---|---|---|
| 3,427,689 | 2/1969 | Windecker | 156/245 |
| 3,507,730 | 4/1970 | Gambill et al. | 156/245 |
| 3,518,146 | 6/1970 | Plympton | 156/245 |
| 3,520,747 | 10/1965 | McGaughey | 428/251 |
| 3,893,488 | 7/1975 | Rogers et al. | 428/246 |
| 4,030,953 | 6/1977 | Rutschow et al. | 156/245 |

Primary Examiner—James J. Bell
Attorney, Agent, or Firm—Wenderoth, Lind & Ponack

[57] ABSTRACT

Quadruple-layer reinforced plastic products having decorative surface designs resembling marble, onyx or the like. Each product comprises four layers: (a) a gel coat layer of clear thermosetting resin, (b) a printed fabric, woven or nonwoven, made of glass fiber or polyester fiber and impregnated with a clear thermosetting resin, (c) a background layer comprised of a thermosetting resin in which an inorganic pigment has been dispersed and (d) a backup layer of FRP.

8 Claims, 2 Drawing Figures

REINFORCED PLASTIC PRODUCTS WITH DECORATED SURFACES

BACKGROUND OF THE INVENTION

1. Summary of the Invention

This invention relates to reinforced plastic products with decorative surfaces having attractive and depth designs resembling the surfaces of onyx and marble. More particularly, this invention relates to reinforced plastic products which display excellent performance characteristics particularly in applications where their surfaces are contacted with cold or/and hot water, such as bathtubs, wash basins, waterproof pans to be employed as the prefabricated bathroom floor, rowboat hulls, etc.

2. Description of the Prior Art

The great majority of reinforced plastic products heretofore available are uni-colored. However, because such uni-colored products cannot fully meet the consumer's requirements, much development effort has been made in recent years to manufacture reinforced plastic products having an aesthetic appearance.

To decorate the surface of such a product, the printing method and the method involving the use of impregnated paper are known. In the case of the printing method, however, the decorative effect attainable is rather prosaic and only superficial, lacking in the sense of depth which is associated, for instance, with onyx or marble. Moreover, the decorative surfaces obtained by printing are inadequate in water resistance and, particularly when the products are contacted with hot water, are ready to become discolored or faded.

The method of producing a design on the surface of plywood using an impregnated paper, that is the method which comprises superimposing a printing paper saturated with a clear synthetic resin on the surface of a plywood and applying both pressure and heat to the assembly over the paper, has also been found to be unsatisfactory in the manufacture of articles, the surfaces of which are to be contacted with hot water in service, such as bathtubs and wash basins, because of the following and other disadvantages. The first disadvantage is that because the impregnated paper is made of cellulosic fiber, it is inadequate in resistance to hot water. The cellulosic fiber, which is organic, gains in volume when contacted with hot water and, consequently, the exposed surface of the product is roughened with time. Experiments have shown that surface defects are encountered when such products are boiled in water for 100 hours on ends. The second disadvantage is that because the paper has a very dense structure, impregnation with an unsaturated polyester resin cannot be thorough enough and removal of air pockets in the resin impregnation step is also inadequate, with the result that fine blisters of the order of 0.1 to 10 mm are produced on the product surface as demonstrated by the boiling resistance test which is normally performed for checking products of this kind for quality, such blisters detracting from the serviceable life of the product.

This invention provides solutions to the foregoing problems. It is, therefore, an object of this invention to provide a reinforced plastic product comprising, either as a whole or in part, a quadruple-layer construction having a surface presenting one of attractive and shimmering effects resembling the rippling surface of marble or the streaked surface pattern of onyx.

It is another object of this invention to provide an aesthetically decorative reinforced plastic product such that its backing FRP layer is not visible from the face side, with only the aforementioned decorative surface effect being clearly visible from the depth of the construction.

It is still another object of this invention to provide a decorative reinforced plastic product having a protective surface layer which is substantially impermeable to cold and hot water and, hence, free from discoloration or changes in color, besides being highly resistant to impact.

It is another yet object of the invention to provide a decorated plastic product incorporating as a decorative layer a woven, or non-woven fabric which is readily susceptible to impregnation with a synthetic resin and to removal of air pockets.

It is a further object of the invention to provide a decorative reinforced plastic product which is lightweight, tough and durable.

The above and other objects as well as the numerous advantages of this invention will become apparent from the following detailed description made with reference to the accompanying drawing.

DETAILED DESCRIPTION OF THE INVENTION

Figure 1:
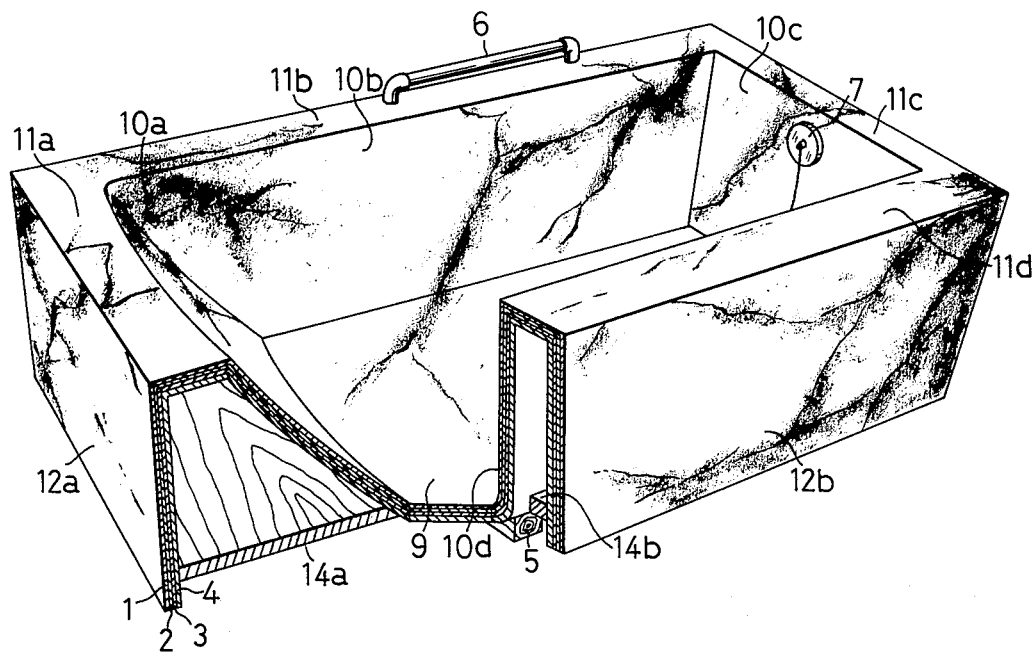
FIG. 1 is a partially exploded perspective view showing a bathtub fabricated in accordance with this invention.
Figure 2:
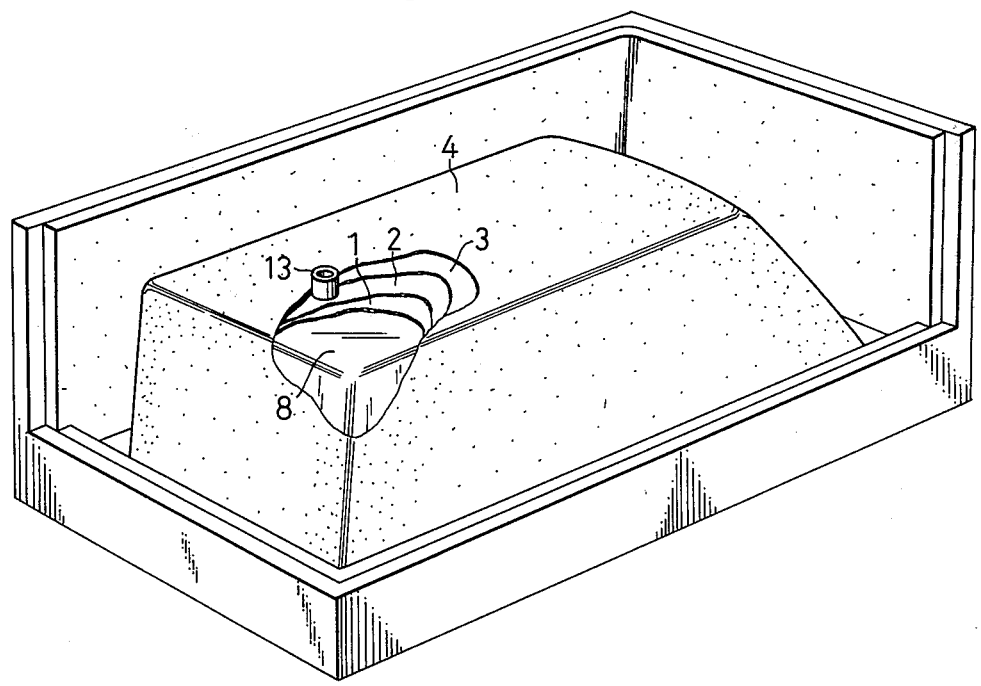
FIG. 2 is a perspective view showing various parts of the bathtub illustrated in FIG. 1 as being laid up on a mold and as partly exploded to show each layer of the structure.

The illustrated bathtub, except for its ancillary components such as a girder 5, a handrail 6 and an overflow cap 7, consists of a quadruple-layer structure which is hereinafter described in detail.

Thus, of the layers constituting said quadruple-layer structure, the uppermost layer is a gel coat layer 1 comprised of a clear thermosetting resin. As examples of said clear synthetic thermosetting resin which is to be employed for the formation of said gel coat layer 1 may be mentioned unsaturated polyester resins in the bisphenol or isophthalic acid series, vinyl ester resins, epoxy resins, etc. The gel coat layer 1 has a thickness in the range of 0.1 to 0.5 millimeter, which protects a decorative layer (2) disposed on the inner side thereof. This gel coat layer 1 is not only impact-resistant but also resistant to hot water. The term 'resistance to hot water' as used throughout this specification means that no surface change occurs even when the product is immersed in hot water over 90° centigrade for a consecutive 500 hours.

Laid up on the inner side of said gel coat layer is a decorated fabric or web 2 which is made of glass fiber or polyester fiber, on which a design generally associatable, for example, with onyx or marble has been printed, and which has been impregnated with a clear thermosetting resin. While the aforesaid fabric made of glass fiber may be one of the conventional woven fabrics, the fabric made of polyester fiber is desirably a nonwoven fabric. The nonwoven polyester fabric is more advantageous than a woven version as will be explained hereinafter, although the latter may also be employed. Insofar as it still lends itself to printing, the fabric 2 is preferably as sheer as possible, normally about 0.1 millimeter in thickness. Made of glass fiber or polyester fiber as aforesaid, the fabric 2 is resistant to hot water. The glass fiber is any of those fibers which are generally employed as reinforcements for FRP articles. Because such materials are previously treated with a coupling agent, they are well compatible with the thermosetting resin with which they are to be impregnated, thus being convenient to employ. Of course, polyester fibers offer excellent compatibility with thermosetting resins. Whether the fabric 2 is made of glass fiber or polyester fiber, the clear thermosetting resin therefore penetrates well into the fabric 2. Moreover, because the fabric 2 has a relatively coarse or open-mesh structure than paper, it is more readily and more thoroughly impregnated with a synthetic resin and lends better to degassing in the course of layup. The clear thermosetting resin is normally selected from among unsaturated polyester resins, vinyl ester resins, epoxy resins and other resins which are resistant to hot water.

On the inner side of the second layer, i.e. fabric 2, is layed up on an opaque or translucent background layer 3 made of a thermosetting resin in which an inorganic pigment has been dispersed. Generally, the thermosetting resin employed for the formation of this layer is also selected from among unsaturated polyester resins, vinylester resins, epoxy resins, etc. The pigment is preferably one which is inert to the other materials employed. The particular type of pigment used is a determinant of what is the background color of the design. Since, normally, the background is preferably white, the pigment is selected from among such materials as titanium oxide, silica, etc.

The fabric 2 as such is opaque but after it has been impregnated with a clear synthetic resin as mentioned hereinbefore, all the design-free areas are clear. Therefore, if the FRP layer described hereinafter is directly laid up on the inner side of the fabric 2, the fiber construction of the FRP layer becomes visible from the face side of the article through the design-free areas to weaken the contrast of the printed design on the fabric 2 against the background, thus failing to impart a desired aesthetic appearance to the final product.

However, in accordance with this invention, because a background layer 3 is laid up on the inner side of said fabric 2, the fiber pattern in a backup layer 4, which is disposed further on the inner side of layer 3, is not visible through the outer layers, with the printed design on the fabric layer 2 alone being vividly and clearly visible. Normally, said background layer 3 has a thickness in the range of about 0.1 to 0.5 millimeter.

Further laid up on the background layer 3 is a backup layer 4 which constitutes the innermost layer. This layer 4 is made of a fiber-reinforced plastic material comprising a reinforcement such as chopped strand mat and a thermosetting resin such as an unsaturated polyester resin, vinyl ester resin, epoxy resin or the like.

Because the strength of the quadruple-layer structure of this invention is primarily accounted for by this backup layer 4, the thickness of the layer 4 depends upon the kind of article to be produced. In the case of a bathtub, for instance, the backup layer 4 may be about 3 millimeters thick but the thickness must be increased to about 10 millimeters when the final product is a rowboat hull, for instance. Thus, one may additionally use a different type of reinforcement in lieu of increasing the thickness of said fiber-reinforced plastic layer or employ a backup layer which, as a whole, is a conventional "sandwich" FRP construction.

The illustrated bathtub may hold 260 l of water and measures 460 millimeters high by 800 millimeters wide by 1510 millimeters long. This bathtub is fabricated by the following procedure. First, a gel coat layer 1 is built up on a mold 8 by the spray-up method. This layer 1 is made of a bisphenol-type unsaturated polyester resin corresponding to Grade UP-CEE of JIS K-6919 (JIS for Japanese Industrial Standard; the same applies wherever it appears hereinafter). The gel coat layer 1 is formed by spraying up a total of 900 grams of said resin in a couple of installments. Then, on this gel coat layer 1 is superimposed a decorative fabric 2 which has been impregnated with 900 grams of the same bisphenol-type unsaturated polyester resin as above. The fabric 2 in the illustrated embodiment is a printed cloth of glass, the substrate glass cloth corresponding to Grade EF-063 of JIS R-3416 and being 0.1 ± 0.01 mm thick, with a density of 60 fibers/25 mm and a weight of 107 g/m². Prior to the superimposition of said fabric 2, one-half of the aforesaid impregnating resin is coated onto the underside of the gel coat layer 1. Following said superimposition, the remaining half of the resin is coated onto the superimposed fabric 2. The fabric 2 has been previously cut to the shapes of a bottom wall 9, four inner side walls 10a, 10b, 10c and 10d, four top walls 11a, 11b, 11c and 11d, and two apron walls 12a and 12b. These fabric pieces are applied over the corresponding areas and held securely in position by means of jigs. The above operation is carried out exercising care to ensure that there will be no residual air pockets between the fabric 2 and the corresponding surface and that the printed design will not appear twisted or deformed. Additional care is required when, at the abutting areas of the fabric pieces, a continuity of the design is desired.

On a curved surface with a small radius of curvature, many wrinkles are formed and, therefore, the printed design tends to be distorted. In such areas, a geometric or orderly printed design is difficult to reproduce. The fairly coarse construction of a nonwoven polyester fabric facilitates a re-distribution of porosity. Stated differently, by spreading wrinkles to coarse areas, all the undesirable wrinkles can be absorbed. It follows, then, that it is worthwhile to contemplate using a nonwoven polyester material in curved areas. The idea of putting a decorative design must be abandoned for curved areas in which the contemplated design cannot be obtained even by such a procedure. Of course, some products may be such that localized designs alone are sufficient to accomplish an aesthetically satisfactory effect. Therefore, the reinforced plastic products according to this invention include products such that only a portion of the article consists in a decorated quadruple-layer structure such as the one described hereinbefore, with the remainder which comprises one or more curved surfaces adjoining and merging with the first-mentioned portion being a dual-layer structure consisting of a gel coat layer and a FRP layer just like the conventional reinforced plastic product. If the design is such that it does not require alignments of its elements, particularly in the case of a psychedelic design, all the aforementioned problems may be solved by using said nonwoven fabric for the curved surfaces, thus enabling one to produce the desired reinforced plastic product.

In the above fabrication of a bathtub, an opaque or translucent background layer of thermosetting resin is laid up on the resin-impregnated fabric 2. This layer 3 is formed by coating a mixture of 800 grams of an isophthalic acid-type unsaturated polyester resin corresponding to Grade UP-CM of JIS K-6919 and 80 grams of rutile-type titanium oxide in a couple of installments.

Finally, on the background layer 3 is laid up a backup layer 4 consisting of two chopped strand mats corresponding to Grade EM-450 of JIS R-341 using 7 kg of the same isophthalic acid-type unsaturated polyester resin.

To the reverse side of the bathtub is attached a thermal insulating material not shown. A girder 5 is secured to the reverse side of the bathtub and a handrail 6 is attached to the top wall 11b, with an overflow cap 7 being attached to the inner wall 10c. A drain-hole 13 is formed through bottom wall 9, while reinforcing plates 14a and 14b are installed across the spaces between the respective side walls as shown.

The bathtubs fabricated in the above manner have passed all the tests and met all the requirements as specified in JIS A 5704, i.e. the appearance test, determination of the thickness of the gel coat layer, a gel coat layer cracking test, a gel coat toughness test, boiling resistance test, water absorption test, tensile test, determination of the degree of cross-linking, deformation test under water-filled conditions, sand bag impact test, poise impact test and hydrochloric acid resistance test. The foregoing description is particularly directed to a bathtub but it should be understood that one skilled in the art may apply the principles of this invention without undue effort to other reinforced plastic products within the principle and scope of the claims appended hereto.

We claim as our invention:

1. A reinforced plastic product having a decorative surface design which comprises, either as a whole or in part, a quadruple-layer structure comprising:

(a) a gel coat layer comprised of a clear thermosetting resin;
(b) a woven or nonwoven fabric of glass fiber or polyester fiber, on which a desired decorative design has been printed and which has been impregnated with a clear thermoplastic resin and laid up on the inner side of said gel coat layer;
(c) a background layer comprised of a thermosetting resin in which an inorganic pigment has been dispersed as laid up on the inner side of said decorated fabric; and
(d) a backup layer comprised of a fiber reinforced plastic material as laid up on the inner side of said background layer.

2. A reinforced plastic product having a decorative surface design as set forth in claim 1 wherein said product is a bathtub.

3. A reinforced plastic product having a decorative surface design as set forth in claim 1 wherein said product is a wash basin.

4. A reinforced plastic product having a decorative surface design as set forth in claim 1 wherein said product is a bathroom waterproof pan.

5. A reinforced plastic product having a decorative surface design as set forth in claim 1 wherein said product is a rowboat hull.

6. A reinforced plastic product having a decorative surface design as set forth in claim 1 wherein said thermosetting resin is selected from the group consisting of unsaturated polyester resins, vinyl ester resins and epoxy resins.

7. A reinforced plastic product having a decorative surface design as set forth in claim 1, wherein said decorative surface design resembles onyx or marble.

8. A reinforced plastic product having a decorative surface design as set forth in claim 1, wherein said pigment is titanium oxide.

* * * * *